March 9, 1948.  C. A. BAUM  2,437,588
CASTER
Filed Nov. 1, 1944  2 Sheets-Sheet 1
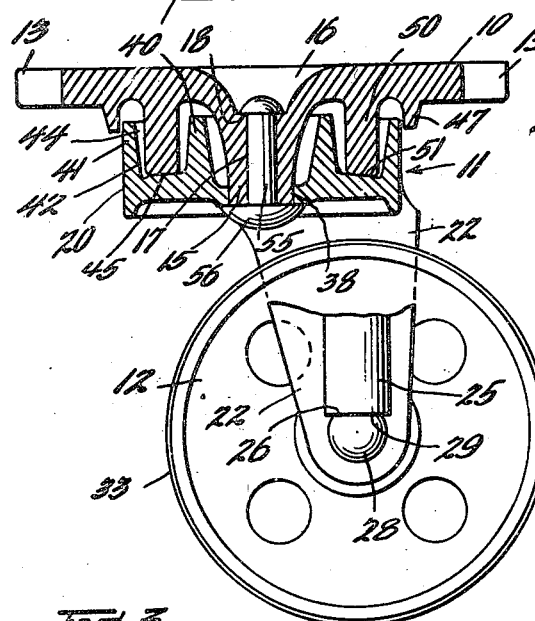
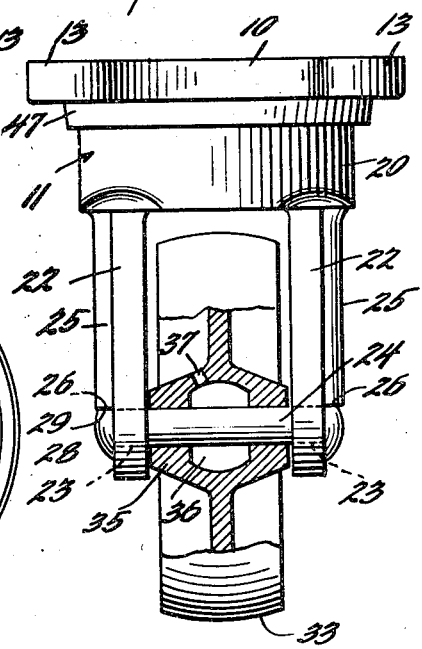
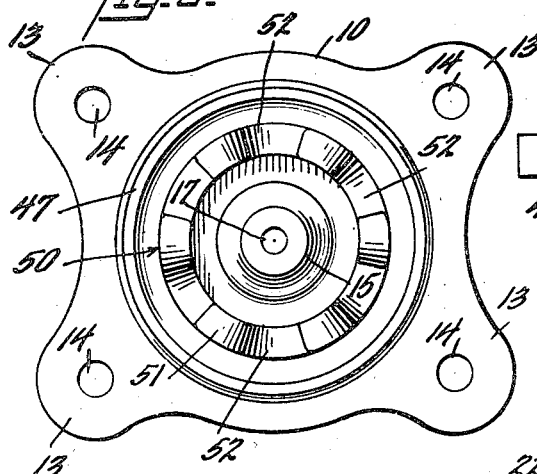
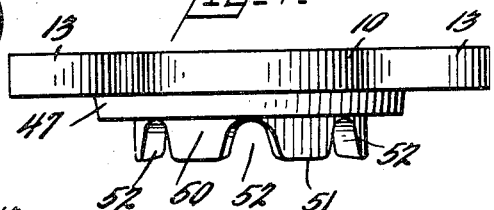
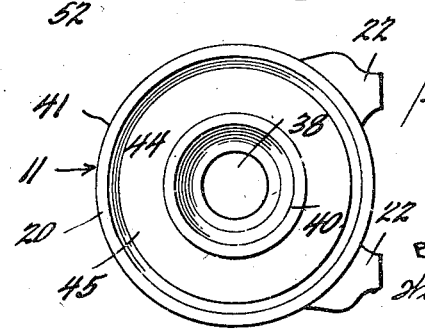
Inventor
CHARLES A. BAUM
By Watson, Cole, Grindle & Watson
Attorney March 9, 1948.  C. A. BAUM  2,437,588
CASTER
Filed Nov. 1, 1944  2 Sheets-Sheet 2
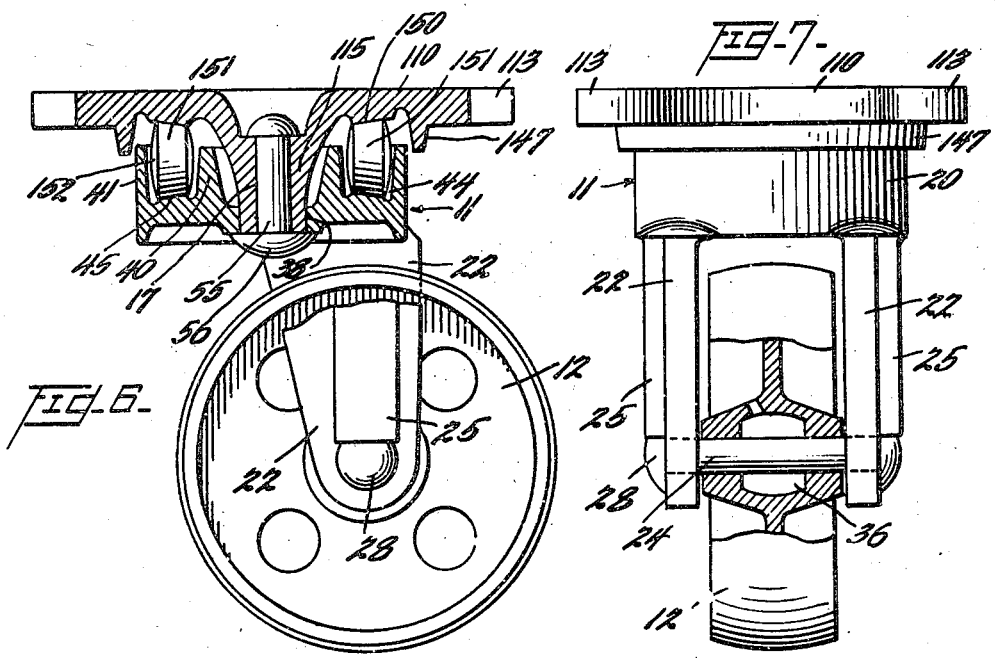
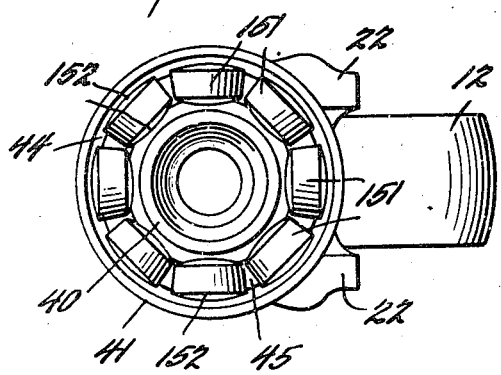
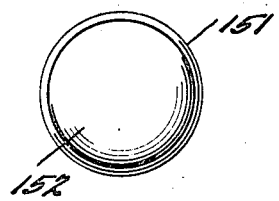
Inventor
CHARLES A. BAUM Patented Mar. 9, 1948

2,437,588

UNITED STATES PATENT OFFICE 2,437,588

CASTER

Charles A. Baum, Hamilton, Ohio

Application November 1, 1944, Serial No. 561,416

6 Claims. (Cl. 16—18)

This invention relates to casters and more particularly to casters for trucks, or similar relatively heavy vehicles, furniture or other equipment.

The general object of the invention is to provide a novel and improved caster of the type described which is simple and sturdy in construction, easy and economical to manufacture and assemble, and capable of swivelling freely under load without jamming or locking.

A more particular object of the invention is the provision of a caster of this type which is dust proof and dirt proof, affording an advantage over casters now in general use which over a period of time become clogged with dirt and grit which causes wear on the relatively moving parts and reduces the efficiency of the caster.

Another object of the invention is to provide a caster which is usable in cast form, that is, without machining the parts. After casting, all of the parts are immediately ready for assembly as soon as the casting gates are removed.

A further object is the provision of a caster which swivels on roller bearings, or rather on relatively large and flat bearing discs, the bearing elements and the cooperating bearing races on the base plate and body member being so constructed and proportioned that the bearings, although not provided with spacers, cannot jam no matter what stress is applied to the caster.

A still further specific object of the invention is to provide a novel caster in which the relatively swivelling parts rotate in sliding contact, and in which novel contacting surfaces are formed on both the base plate and the swivelling body of the caster, so as to reduce wear, eliminate unnecessary friction, and cause the device to function perfectly under heavy loads.

Other objects and features of novelty will be apparent from the following specification when read in connection with the accompanying drawings in which certain embodiments of the invention are illustrated by way of example.

In the drawings:

Figure 1 is a view in vertical section of a caster embodying the principles of the invention;

Figure 2 is a view in end elevation of the same caster, the hub of the wheel being shown in section;

Figure 3 is a bottom plan view of the base plate of the caster which is secured to the truck or other body to which the caster is applied;

Figure 4 is a view in side elevation of the same member;

Figure 5 is a top plan view of the swivelling body member of the caster;

Figure 6 is a view in vertical section of a modified form of caster coming within the general scope of the present invention, and utilizes roller bearings as an anti-friction means;

Figure 7 is an end view of this embodiment;

Figure 8 is a top plan view of the body portion or housing member of the caster, with the roller bearings applied; and Figure 9 is a view in side elevation of one of the tapered roller bearings.

Referring now to Figures 1 to 5 inclusive illustrating one embodiment of the invention, it will be seen that the caster assembly comprises essentially the base plate 10, the body portion or housing member 11, and the supporting wheel 12. The plate 10 may be of any peripheral configuration but is preferably of the contour shown in Figure 3 having four ears 13 perforated as at 14 for the insertion of bolts or screws to secure it firmly to the underside of the truck or other equipment or body to which the caster is applied.

Centrally of the plate 10 there is provided a depending hollow boss or stem 15 above which there is formed a recess 16 which is separated from the central bore 17 of the stem by means of the horizontal shoulder 18.

The swivelling housing or body portion 11 of the caster has a substantially cylindrical outer configuration at its upper portion 20 and formed on this upper portion are the downwardly depending spaced arms 22. These arms are of course offset from the center of the caster so as to attain the swivelling action and are provided with bearing openings 23 at their lower ends through which the axle 24 extends. The wheel 12 is rotatably mounted upon the axle 24. Upon the outer faces of the depending arms 22 are formed the vertical ribs 25 each having a flat shoulder 26 formed at the lower end thereof. The axle 24 is provided at each end with a head 28 which for the most part is of a spherical configuration but is cut away along one chord to form a flat face 29 adapted to contact with the adjacent shoulder 26 of a rib 25 when the axle 24 is applied. This will effectively prevent rotation of the axle.

The tire 33 of the axle 12 is preferably of a substantially spherical contour to aid in the swivelling action. The hub 35 of the wheel is of a double frusto-conical outer configuration and is provided centrally with a chamber 36 for lubricating grease which is applied through the opening 37 in the hub by means of a grease gun or other accessory.

The upper portion 28 of the swivelling body member or housing 11 is provided centrally with an opening 38 adapted to receive the lower end of the hollow boss or stem 15 which extends from the base plate 10. Outwardly of this central opening, an upwardly extending annular rib or flange 40 is formed which has inclined side walls. The extreme outer wall of the upper portion 28 and the swivelling member 11 is comprised chiefly by the outwardly extending annular flange 41 concentric with the inner flange 40, having an inclined inner side wall 42 and being spaced from the inner flange 40 to provide an annular bearing pocket 44. The bottom surface 45 of the bearing pocket 44 is tapered or inclined so that its radially inner portion is slightly higher than the outer portion.

Embracing the outer rib or flange 41 and depending from the base plate 10 is the downwardly directed annular flange 47. This flange cooperates with the flange 41 to provide a dust and dirt excluding means.

Also depending from the base plate 10 is the annular bearing rib or flange 50. This flange has a tapered bottom surface 51 of complementary configuration to the tapered surface 45 of the bearing recess 44, and the surface 51 is interrupted at intervals by the gaps or intervals 52 as clearly shown in Figures 3 and 4 of the drawings. This arrangement serves to reduce the bearing surface to the minimum required to support the load.

A rivet 55 is inserted through the opening 17 in the plate 10 and the lower head 56 of the rivet overlies the margins of the opening 38 in the housing member 11. The upper end of the rivet is headed over and bears upon the shoulder 18 of the plate and the two relatively swivelling parts are thus retained in assembled relationship even when the truck or member to which the caster is applied is lifted from the floor.

In the embodiment illustrated in Figures 6 to 9 inclusive of the drawings, the swivelling or housing member 11 and the wheel 12 are of exactly the same construction as the corresponding elements shown and described in connection with the first embodiment and the parts will be given the same reference numerals.

The plate 110 in this embodiment is furnished with ears 113 by means of which it may be secured to the truck or other equipment, and it is provided centrally with the depending hollow boss or stem 115 which enters the central opening 38 of the member 11 and is connected with the latter by means of the bolt 55.

The plate 110 is also provided with the radially outwardly disposed depending annular flange 147 which embraces the outer upwardly extending outer flange 41 of the member 11 in dust excluding relationship.

The plate 110 differs from the plate 10 of the embodiment first described in that, instead of the depending bearing flange 50, the plate is provided with an inclined or tapered bearing surface 150 which is disposed opposite to and in complementary relationship with the inclined bearing surface or track 45 formed at the bottom of the pocket 44 of the member 11. These bearing surfaces or tracks 45 and 150 are disposed in radially inwardly converging relationship and a plurality of tapered bearing discs 151 are disposed between these tracks and within the pocket 44. The roller bearing discs 151 are tapered to fit the tracks 45 and 150 and the lateral surfaces 152 are of a substantially spherical shape.

In order to reduce the friction of the swivelling movement the roller bearing discs 151 are made as large as practicable and are as few in number as can effectively serve the purpose. In the embodiment illustrated, eight of these roller bearing discs are shown and the ratio of the mean diameter of the roller bearing discs to the mean diameter of the tracks 45 and 150 is in the neighborhood of approximately one to three. Of course, within the scope of the invention, the number of bearing discs and these diameter ratios may be varied to some extent without danger of jamming or producing excess friction. For example, the number of bearing discs may well vary from say six to twelve, and the relative dimension of the diameters accordingly, maintaining the spacing of the discs within reasonable limits. Such permissible variations would bring the disc-to-track diameter ratios roughly within the limits of 1:8 to 1:3. The inclined faces 142 of the inner walls of the pocket 44 serving to guide the rollers by contact with the spherical end surfaces of the discs.

Preferably, all of the parts are cast in final finished form without the necessity of machining, the only requirement being to remove the casting gates before assembly. Alternatively, the parts may be made of malleable iron or mechanite metal.

Various changes and modifications may be made in the embodiments illustrated and described herein without departing from the scope of the invention as defined by the following claims.

Having thus described the invention what is claimed as new and desired to be secured by Letters Patent is:

1. A caster of the class described comprising in combination a plate adapted to be secured to a truck or the like, a depending substantially centrally disposed stem carried by said plate, a swivelling housing member having a caster wheel rotatably mounted thereon, said housing member being provided with a central opening to receive said stem with a snug bearing fit, this radial bearing between said stem and said housing member being the sole radial bearing of said caster, means for securing said housing member and said stem rotatably together, two concentric annular flanges formed on said housing member, projecting upwardly therefrom, and spaced apart to provide between them an annular pocket having substantially smooth uninterrupted side walls, the bottom of said pocket comprising an annular radially inclined uninterrupted track the radially inner side of the track being higher than the outer, the cross-section of said pocket being at least as deep as it is wide an annular downwardly projecting flange on said plate adapted to enclose the outer of the two flanges on the housing member to exclude dust and the like, and narrow annular thrust bearing means adapted to move on said track to support said plate upon said housing members.

2. A caster of the class described comprising in combination a plate adapted to be secured to a truck or the like, a depending substantially centrally disposed stem carried by said plate, a swivelling housing member having a caster wheel rotatably mounted thereon, said housing member being provided with a central opening to receive said stem with a snug bearing fit, this radial bearing between said stem and said housing member being the sole radial bearing of said caster, means for securing said housing member and said stem rotatably together, two concentric annular flanges formed on said housing member, projecting upwardly therefrom, and spaced apart to provide between them an annular pocket, having substantially smooth uninterrupted side walls, the bottom of said pocket comprising an annular radially inclined uninterrupted track, the radially inner side of the track being higher than the outer, the cross section of said pocket being at least as deep as it is wide an annular downwardly projecting flange on said plate adapted to enclose the outer of the two flanges on the housing member to exclude dust and the like, a depending annular flange formed on said plate inwardly of said dust excluding flange and having its lower edge bearing on said track to provide thrust bearing means between said plate and said housing member, said last named flange being free of contact laterally with the inner walls of said two first named concentric flanges.

3. A caster of the class described comprising in combination a plate adapted to be secured to a truck or the like, a depending substantially centrally disposed stem carried by said plate, a swivelling housing member having a caster wheel rotatably mounted thereon, said housing member being provided with a central opening to receive said stem with a snug bearing fit, this radial bearing between said stem and said housing member being the sole radial bearing of said caster, means for securing said housing member and said stem rotatably together, two concentric annular flanges formed on said housing member, projecting upwardly therefrom, and spaced apart to provide between them an annular pocket, having substantially smooth uninterrupted side walls, the bottom of said pocket comprising an annular radially inclined uninterrupted track, the radially inner side of the track being higher than the outer, the cross section of said pocket being at least as deep as it is wide, an annular downwardly projecting flange on said plate adapted to enclose the outer of the two flanges on the housing member to exclude dust and the like, a depending annular flange formed on said plate inwardly of said dust excluding flange and having its lower edge bearing on said track to provide thrust bearing means between said plate and said housing member, said last named depending flange being notched to provide somewhat rounded tongue-like projections whereby only circumferentially spaced radially bevelled sections thereof bear on said track.

4. A caster of the class described comprising in combination a plate adapted to be secured to a truck or the like, a depending substantially centrally disposed stem carried by said plate, a swivelling housing member having a caster wheel rotatably mounted thereon, said housing member being provided with a central opening to receive said stem with a snug bearing fit, this radial bearing between said stem and said housing member being the sole radial bearing of said caster, means for securing said housing member and said stem rotatably together, two concentric annular flanges formed on said housing member, projecting upwardly therefrom, and spaced apart to provide between them an annular pocket of a depth greater than its width, and having substantially smooth uninterrupted side walls, the bottom of said pocket comprising an annular radially inclined uninterrupted track, the radially inner side of the track being higher than the outer, an annular downwardly projecting flange on said plate adapted to enclose the outer of the two flanges on the housing member to exclude dust and the like, an annular radially inclined track formed on said plate and disposed above and in spaced relationship to the track on the housing member, a plurality of flat, somewhat frusto-conical bearing discs disposed between said tracks and guided between the concentric flanges on the housing member, the inner walls of said pocket being upwardly divergent and the end walls of said bearings being of a substantially spherical contour.

5. A caster as set forth in claim 4 in which the diameter of each of the bearing discs is approximately twice the width thereof.

6. A caster of the class described comprising in combination a plate adapted to be secured to a truck or the like, a depending substantially centrally disposed stem carried by said plate, a swivelling housing member having a caster wheel rotatably mounted thereon, said housing member being provided with a central opening to receive said stem with a snug bearing fit, this radial bearing between said stem and said housing member being the sole radial bearing of said caster, means for securing said housing member and said stem rotatably together, two concentric annular flanges formed on said housing member, projecting upwardly therefrom, and spaced apart to provide between them an annular pocket of a depth greater than its width, an annular radially inclined track formed on said housing member at the bottom of said pocket, the radially inner side of the track being higher than the outer, an annular downwardly projecting flange on said plate adapted to enclose the outer of the two flanges on the housing member to exclude dust and the like, an annular radially inclined track formed on said plate and disposed above and in spaced relationship to the track on the housing member, a plurality of flat, somewhat frusto-conical bearing discs disposed between said tracks and guided between the concentric flanges on the housing member, the diameters of said bearing discs being of the order of from about one-eighth to about one-third of the mean diameter of the track.

CHARLES A. BAUM.

REFERENCES CITED

The following references are of record in the file of this patent:

UNITED STATES PATENTS

| Number | Name | Date |
| --- | --- | --- |
| 42,338 | Beach | Apr. 19, 1864 |
| 50,249 | Holmes | Oct. 3, 1865 |
| 240,812 | Coleman | May 3, 1881 |
| 770,527 | Kelly | Sept. 20, 1904 |
| 1,532,033 | Bowen (2) | Mar. 31, 1925 |
| 1,576,923 | Malloy | Mar. 16, 1926 |
| 1,588,300 | Bowen (1) | June 8, 1926 |
| 1,711,723 | Cousins | May 7, 1929 |